Patented Feb. 8, 1938

2,107,710

UNITED STATES PATENT OFFICE

2,107,710

VAPOR PHASE HYDROLYSIS OF HALOGENATED HYDROCARBONS

Ralph P. Perkins and Andrew J. Dietzler, Midland, Mich., assignors to The Dow Chemical Company, Midland, Mich., a corporation of Michigan No Drawing. Application April 29, 1936, Serial No. 77,021

9 Claims. (Cl. 260—154)

This invention concerns an improved method of hydrolyzing a halo-hydrocarbon in vapor phase and certain catalysts which are exceptionally effective in promoting such hydrolysis. It particularly concerns the vapor phase hydrolysis of chlorobenzene to produce phenol.

It is known that chlorobenzene may be hydrolyzed by heating the same under pressure with an aqueous alkali to produce phenol. However, such process is somewhat objectionable because of the alkali consumed, the high pressure employed, and the expensive apparatus required.

Numerous attempts have been made to develop a process whereby chlorobenzene may be hydrolyzed in vapor phase with steam at atmospheric pressure or thereabout, and a variety of substances have been tested as catalysts for such reaction, but to date the attempts have met with only mediocre success and have not led to commercially practical results. Among the various materials which have been tested as catalysts for the vapor phase reaction are:—aluminum oxide; magnesium oxide; ferric oxide; thorium oxide; tungsten oxide; silica gel; bleaching earths; calcium phosphate both alone and in admixture with other inorganic compounds; diatomaceous earths impregnated with copper chloride; and a gel prepared by mixing solutions of sodium silicate, basic copper carbonate, and ammonia. All such catalysts have been found deficient, for the reason that they do not give a satisfactory rate of hydrolysis at practical operating temperatures, or that the yield of phenol is low, or that their activity is lost rapidly, or that they cannot be reactivated after use.

An object of the present invention is to provide new catalysts which are easily and economically prepared, highly effective in promoting the vapor phase hydrolysis of chlorobenzene to form phenol, retain their catalytic activity exceptionally well, and which may be reactivated after use and reemployed in the process. Another object is to provide an improved method of hydrolyzing chlorobenzene in vapor phase, wherein such catalyst is employed. Other objects will be apparent from the following description of the invention.

According to the invention, a basic metal compound, e. g., oxide, hydroxide or salt, is incorporated with silica gel to form a composite catalyst for the vapor phase hydrolysis of a halo-hydrocarbon, e. g., chlorobenzene. As hereinbefore pointed out, certain basic compounds have previously been tested and are not satisfactory as catalysts for such reaction. We have discovered that the activity of the catalyst, its useful life, and ability to be reactivated after use are dependent, not only on its chemical composition, but also on its physical structure and the procedure by which it is prepared. We have further found that an active catalyst for such reaction possessing an exceptionally long life can be prepared by immersing silica gel in a solution of a hydrolyzable metal salt, particularly a salt of a metal belonging to Groups II B, III B, IV A or B, or V B of the periodic system, and thereafter washing the gel with water.

The catalyst prepared as described above appears to be silica gel having a small proportion of a metal oxide or hydroxide or a basic metal salt adsorbed in its pores. It is a highly active catalyst for the vapor phase hydrolysis of chlorobenzene with water vapor, possesses a longer active life than does any other active catalyst which has been tested for said reaction, and after use it can be reactivated merely by heating the same in a stream of air or oxygen. The invention then consists in the method and catalysts hereinafter fully described and particularly pointed out in the claims.

As stated above, our catalyst is prepared by immersing silica gel in a solution of one or more hydrolyzable metal salts and thereafter washing the gel with water. The salt solution preferably includes one or more salts of metals belonging to Groups II B, III B, IV A or B, or V B of the periodic system, since such salt forms a particularly active and durable catalyst. Among the various metal salts which may be employed are beryllium nitrate, magnesium sulphate, zinc sulphate, cadmium nitrate, boron fluoride, aluminum chloride, stannous chloride, lead nitrate, titanium tetrachloride, antimony nitrate, bismuth chloride, etc. The salt is preferably applied to the silica gel as a 0.1 to 1.0 normal aqueous solution thereof, but it may be used in other concentrations, if desired. When the salt is soluble in solvents other than water, e. g., alcohol, acetone, acetic acid, etc., it may be applied as a solution in such solvent.

After the silica gel has stood in the salt solution for some time, usually from 1 to 10 hours, it is removed and washed thoroughly with water. The operation of washing the treated gel with water causes hydrolysis of the salt contained therein and removal of the soluble acid, leaving as a residue silica gel containing a small proportion of insoluble metal oxide, hydroxide, or basic salt in its pores. The product may be dried at room temperature or above.

In employing the catalyst for the vapor phase hydrolysis of chlorobenzene, a vapor mixture of chlorobenzene with preferably its molecular equivalent or more of water is passed over or through a body of the granular catalyst heated to a temperature above 300° C., preferably between 350° and 650° C. The vapor mixture leaving the catalyst is cooled sufficiently to condense the phenol product and the latter is purified by distillation. Any unreacted chlorobenzene is recycled in the process and the hydrochloric acid generated by the hydrolysis may be collected as a by-product.

During operation in the manner just described, the catalyst eventually becomes coated with tarry material and loses its activity. The flow of chlorobenzene is then interrupted, steam is blown over the catalyst to remove any chlorobenzene, and a stream of air or oxygen is passed over the hot catalyst to reactivate the same, the catalyst being heated to a temperature sufficient to oxidize the tars, etc., adhering thereto. Temperatures between 400° and 700° C. are usually sufficient for such purpose. The flow of air or oxygen is then discontinued, the catalyst is blown free of oxygen with steam, after which the production of phenol by passage of water and chlorobenzene vapors over the catalyst is continued. After reactivation, the catalyst is sometimes more effective than it was initially to promote the reaction.

The following table gives the results obtained in a series of experiments wherein various materials were tested as catalysts for the hydrolysis of chlorobenzene to produce phenol. In each experiment, equal parts by weight of water and chlorobenzene were passed in continuous flow first into a mixing chamber wherein they were mixed, thence through a heated zone wherein they were vaporized, and the vapors were passed through a body of granular catalytic material, heated to a temperature between 526° and 536° C., at a rate corresponding to between 1400 and 1600 grams of the vapor mixture per liter of the catalyst (capable of passing a 10 mesh screen) per hour. Run No. 1 of the table, wherein silica gel alone was tested as a catalyst, is presented for purpose of comparison with the other runs, wherein samples of silica gel which had been immersed for 2 hours in 0.2 normal aqueous solutions of the respective salts named in the table and subsequently washed with water were employed as catalysts. Although each catalyst prepared by such treatment is referred to in the table as silica gel treated with a named salt, it is to be understood that the catalytic material actually used in such instance consisted of silica gel containing a basic metal compound derived by hydrolysis of such salt. The vapors leaving the catalyst were cooled to condense the same, phenol and chlorobenzene were separated from the condensate by usual procedure, e. g., mechanical separation of the organic and aqueous layers followed by extraction of the aqueous layer with a water immiscible organic solvent such as chlorobenzene, and the phenol was separated and purified by distillation. In most of the experiments, the yield of phenol based on the chlorobenzene reacted and the grams of phenol produced per liter of catalyst per hour were determined both at the start of the reaction and after 20 hours of continuous operation. The reaction was then interrupted, the catalyst was reactivated by heating to about 525° C. for 2 hours in a current of air, and the reaction for the production of phenol was then continued, the yields just mentioned being redetermined. In the table the per cent yields of phenol, based on the chlorobenzene reacted, are captioned by the letter "A" and the rates of phenol production in terms of grams of phenol per liter of catalyst per hour are captioned by the letter "B".

Table

| Run No. | Catalyst—silica gel treated with: | Phenol yields and rates of phenol production | | | | | |
|---|---|---|---|---|---|---|---|
| | | Initial | | After 20 hrs. of operation | | After reactivating the catalyst | |
| | | A | B | A | B | A | B |
| 1 | None | 81 | 50.9 | 31.2 | 2.9 | 58.4 | 24.8 |
| 2 | BeCl$_2$ | 81.2 | 79.0 | 62.4 | 34.1 | 88.6 | 66.1 |
| 3 | MgCl$_2$ | 85.8 | 90.0 | 67.8 | 18.6 | 81.0 | 55.1 |
| 4 | ZnSO$_4$ | 97 | 56.0 | | | | |
| 5 | (CdCl$_2$) | 87.1 | 99.5 | 79.4 | 43.6 | 90.8 | 68.4 |
| 6 | Al$_2$(SO$_4$)$_3$ | 92.5 | 47.0 | 88.7 | 44.0 | 89.6 | 53.9 |
| 7 | ZrCl$_4$ | 85.0 | 96.5 | 57.4 | 15.3 | 73.8 | 44.2 |
| 8 | SnCl$_2$ | 85.0 | 47.6 | 73.3 | 19.8 | 90.5 | 52.3 |
| 9 | SbCl$_3$ | 80.5 | 91.1 | 50.7 | 20.4 | 86.8 | 56.6 |

It will be noted that untreated silica gel is initially effective but rapidly loses its activity and cannot be reactivated sufficiently, by heating in a current of air, to be suitable for re-employment in the process. In contrast it will be noted in Runs 2–9 of the table that silica gel, which has been treated with a metal salt solution and subsequently washed with water, initially is usually a more efficient catalyst than silica gel alone; that it retains its catalytic activity during use to far greater extent than does untreated silica gel; and that after use in the hydrolysis it can satisfactorily be reactivated by heating in a current of air. In Run No. 8, the catalyst was more efficient after being used and reactivated than when initially employed in the process.

In the above table, we have demonstrated that our treated silica gel catalysts, comprising basic metal compounds, are more active and durable than silica gel alone in promoting the vapor phase hydrolysis of chlorobenzene. Norris and Jenkins, in U. S. Patent No. 1,884,710, have reported that the activity of silica gel as a catalyst for the vapor phase hydrolysis of chlorobenzene and the period during which said catalyst may satisfactorily be employed in such reaction may be increased by mixing a volatile copper compound with the water and chlorobenzene vapor mixture prior to contacting the latter with said catalyst. We have found that the activity of our treated silica gel catalysts may be increased in similar manner and that when operating in such manner, using a treated silica gel catalyst of the type herein claimed, the rate of phenol production and the yield of phenol on reacted chlorobenzene are further increased. This fact is substantiated in the following table, which gives the rates of phenol production and the yields of phenol on reacted chlorobenzene obtained in three comparative experiments.

The experiments, from which the data in the table below were collected, were carried out as follows:—(I) a vapor mixture containing equal parts by weight of water and chlorobenzene was passed consecutively through a copper gauze and a bed of silica gel, both contained in a tube heated to 465° C., the rate of passage being 430 grams of the vapor mixture per liter of silica gel (capable of passing a 10 mesh screen) per hour and the yield of phenol and rate of phenol production being determined as in the foregoing examples; (II) a vapor mixture containing equal parts by weight of water and chlorobenzene was passed through a bed of a granular catalyst (capable of passing a 10 mesh screen) heated to 455° C., the rate of flow being 544 grams of the vapor mixture per liter of catalyst per hour, the catalyst employed being one prepared by immersing silica gel in a 0.2 normal aqueous aluminum sulphate solution for 2 hours and subsequently washing the gel with water; (III) a vapor mixture containing equal parts by weight of water and chlorobenzene was passed consecutively through a copper gauze and a catalyst similar to that used in Experiment (II), the copper gauze and the catalyst being contained in a tube heated to 450° C. and the rate of vapor flow being 530 grams of the vapor mixture per liter of catalyst per hour. The rates of phenol production and yields of phenol in these experiments were determined as in the examples hereinbefore described. In the table the per cent yields of phenol, based on the chlorobenzene reacted, are captioned by the letter "A" and the rates of phenol production in terms of grams of phenol per liter of catalyst per hour are captioned by the letter "B".

Table

| Run No. | Phenol yields and rates of phenol production | | | |
|---|---|---|---|---|
| | Initial | | After 12 hrs. of operation | |
| | A | B | A | B |
| I | 94 | 25.8 | 84.1 | 21.1 |
| II | 85.5 | 25.0 | | |
| III | 96.9 | 61.5 | 89.4 | 47.4 |

The yield of phenol and the rate of phenol production are seen to be higher when the vapor mixture of water and chlorobenzene is passed through a copper screen and then over a composite catalyst of the kind herein claimed, comprising silica gel having a basic metal compound absorbed therein, than when such copper screen is omitted, or when a copper screen is used with a catalyst consisting of silica gel alone.

For the purpose of further testing the catalyst and procedure described in the above Experiment (III), the experiment was repeated under the following more severe operating conditions:—(1) the rate of vapor flow was 4,000 grams of the vapor mixture per liter of catalyst per hour and (2) the copper gauze and catalyst were heated to 545° C. At the start of the reaction, 218 grams of phenol were produced per liter of catalyst per hour and the yield of phenol on the chlorobenzene reacted was 92.7 per cent of theoretical. After 20 hours of continuous operation, the rate of phenol production had dropped to 82.5 grams per liter of catalyst per hour and the yield of phenol on the chlorobenzene reacting was 63.8 per cent of theoretical. The process was then interrupted and the catalyst reactivated by heating the same in a current of air. When the passage of steam and chlorobenzene over the copper gauze and reactivated catalyst was resumed, the rate of phenol production rose to 238 grams per liter of catalyst per hour and the yield of phenol was 92.3 per cent of theoretical, based on the chlorobenzene reacted. It is apparent that this mode of operation is exceptionally effective in promoting the hydrolysis of chlorobenzene to produce phenol and that the catalyst employed may be successfully reactivated after use in the process.

The preferred mode of operation just described consists essentially in passing a vapor mixture of water, chlorobenzene, and a volatile copper compound over a catalyst of the type claimed, heated to a temperature sufficient to cause reaction between the steam and chlorobenzene. For convenience, the copper compound is preferably introduced into the vaporized reactants by passing one or both of the latter over metallic copper as described above, but it may be introduced in other ways, e. g., by passing one or both of the vaporized reactants over a body of a copper compound such as copper chloride, copper sulphate, copper silicate, etc., or by separately vaporizing such copper compound and injecting its vapors into the stream of vaporized reactants.

The catalysts and method herein disclosed may also be used in hydrolyzing other halogenated organic compounds with steam. Among the various halogenated compounds which may be hydrolyzed with steam in the presence of such catalysts are:—bromobenzene, chlorotoluene, chlorodiphenyl, chloronaphthalene, ethyl chloride, dichloropropane, etc. The temperature at which such hydrolysis is to be carried out is dependent, of course, on the particular halogenated organic compound under treatment.

Other modes of applying the principle of the invention may be employed instead of those explained, change being made as regards the method or ingredients herein disclosed provided the steps or ingredients stated by any of the following claims or the equivalent of such stated steps or ingredients be employed.

We therefore particularly point out and distinctly claim as our invention:—

1. A catalyst prepared by treating silica gel with a solution of a hydrolyzable salt of a metal belonging to one of the Groups II B, III B, IV A and B, and V B of the periodic system and thereafter washing the gel with water.

2. A catalyst for the vapor phase hydrolysis of a chlorinated aromatic hydrocarbon consisting essentially of silica gel having adsorbed in its pores a basic compound of a metal belonging to one of the Groups II B, III B, IV A and B, and V B of the periodic system, and prepared by treating silica gel with an aqueous solution of a salt of such metal and thereafter washing the gel with water.

3. A catalyst for the vapor phase hydrolysis of chlorobenzene consisting essentially of silica gel having a basic aluminum compound adsorbed in its pores, and prepared by treating silica gel with an aqueous solution of an aluminum salt and thereafter washing the gel with water.

4. A catalyst for the vapor phase hydrolysis of chlorobenzene consisting essentially of silica gel having a basic cadmium compound adsorbed in its pores, and prepared by treating silica gel with an aqueous solution of a cadmium salt and thereafter washing the gel with water.

5. The method of hydrolyzing a halogenated aromatic hydrocarbon which comprises reacting vapors of such compound with water in the presence of a catalyst consisting essentially of silica gel having adsorbed in its pores a basic compound of a metal belonging to one of the Groups II B, III B, IV A and B, and V B of the periodic system, which catalyst is prepared by treating silica gel with an aqueous solution of a salt of said metal and thereafter washing the gel with water.

6. The method which comprises introducing vapors of a copper compound into a vapor mixture of chlorobenzene and water and passing the resultant vapor mixture over a porous catalyst at a temperature sufficient to cause reaction between the chlorobenzene and water, said catalyst consisting essentially of silica gel having adsorbed in its pores a basic compound of a metal belonging to one of the Groups II B, III B, IV A and B, and V B of the periodic system and being prepared by treating silica gel with an aqueous solution of a salt of said metal and thereafter washing the gel with water.

7. The method of making phenol which comprises reacting vapors of chlorobenzene with water vapor in the presence of a catalyst consisting essentially of silica gel having a basic aluminum compound deposited in its pores, which catalyst is prepared by treating silica gel with an aqueous solution of an aluminum salt and thereafter washing the gel with water.

8. The method which comprises passing a vapor mixture of chlorobenzene and water consecutively over metallic copper and a porous catalyst at a temperature sufficient to cause reaction between the chlorobenzene and water, said catalyst consisting essentially of silica gel having a basic aluminum compound adsorbed in its pores and being prepared by treating silica gel with an aqueous aluminum salt solution and thereafter washing the gel with water.

9. The method of making phenol which comprises reacting vaporized chlorobenzene with water vapor in the presence of a catalyst consisting essentially of silica gel having a basic cadmium compound deposited in its pores, which catalyst is prepared by treating silica gel with an aqueous solution of a cadmium salt and thereafter washing the gel with water.

RALPH P. PERKINS.
ANDREW J. DIETZLER.